United States Patent
Rowlands et al.

(10) Patent No.: US 9,563,562 B2
(45) Date of Patent: Feb. 7, 2017

(54) PAGE CROSSING PREFETCHES

(71) Applicant: NVIDIA Corporation, Santa Clara, CA (US)

(72) Inventors: Joseph Rowlands, Alviso, CA (US); Anurag Chaudhary, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 321 days.

(21) Appl. No.: 13/686,799

(22) Filed: Nov. 27, 2012

(65) Prior Publication Data

US 2014/0149679 A1 May 29, 2014

(51) Int. Cl.
G06F 12/00 (2006.01)
G06F 12/08 (2016.01)

(52) U.S. Cl.
CPC ..... *G06F 12/0862* (2013.01); *G06F 2212/655* (2013.01)

(58) Field of Classification Search
None
See application file for complete search history.

(56) References Cited

U.S. PATENT DOCUMENTS

| | | | |
|---|---|---|---|
| 6,345,339 B1 | 2/2002 | Arimilli et al. | |
| 6,507,895 B1 | 1/2003 | Wang et al. | |
| 7,975,108 B1 | 7/2011 | Holscher et al. | |
| 8,356,142 B1 | 1/2013 | Danilak | |
| 8,356,143 B1 | 1/2013 | Bulusu et al. | |
| 8,683,132 B1 | 3/2014 | Danilak | |
| 2007/0067382 A1 | 3/2007 | Sun | |
| 2007/0266228 A1 | 11/2007 | Smith et al. | |
| 2007/0283134 A1 | 12/2007 | Smith et al. | |
| 2008/0034187 A1 | 2/2008 | Stempel et al. | |
| 2009/0198909 A1* | 8/2009 | Speight et al. | 711/137 |
| 2009/0216956 A1* | 8/2009 | Ekanadham et al. | 711/137 |
| 2009/0248983 A1 | 10/2009 | Offen et al. | |
| 2011/0113199 A1 | 5/2011 | Tang et al. | |
| 2011/0161589 A1 | 6/2011 | Guthrie et al. | |
| 2012/0144104 A1 | 6/2012 | Gibney et al. | |
| 2013/0103912 A1 | 4/2013 | Jones et al. | |
| 2013/0185515 A1 | 7/2013 | Sassone et al. | |
| 2014/0149668 A1 | 5/2014 | Chaudhary | |
| 2014/0149678 A1 | 5/2014 | Chaudhary | |

OTHER PUBLICATIONS

Gao et al., "Two-level Data Prefetching", 2007, IEEE, pp. 238-244.
Irie, et al., CCCPO: Robust Prefetcher Optimization Technique Based on Cache Convection, 2011 Second International Conference on Networking and Computing, Nov. 30, 2011-Dec. 2, 2011, p. 127-133, IEEE, Tokyo, Japan.

* cited by examiner

Primary Examiner — Baboucarr Faal

(57) ABSTRACT

Prefetching is permitted to cross from one physical memory page to another. More specifically, if a stream of access requests contains virtual addresses that map to more than one physical memory page, then prefetching can continue from a first physical memory page to a second physical memory page. The prefetching advantageously continues to the second physical memory page based on the confidence level and prefetch distance established while the first physical memory page was the target of the access requests.

16 Claims, 6 Drawing Sheets

PAGE CROSSING PREFETCHES

BACKGROUND

A primary factor in the utility of a computer system is the speed at which the computer system can execute an application. It is important to have instructions and data available at least as fast as the rate at which they can be executed, to prevent the computer system from idling (stalling) while it waits for the instructions and/or data to be fetched from main memory.

A widely used solution to reduce or prevent stalling is to implement a hierarchy of caches in the computer system. In essence, one or more caches are situated between the main memory and the central processing unit (CPU). The caches store recently used instructions and data based on the assumption that information might be needed again. By storing information in a hierarchical manner, the caches can reduce latency by providing information more rapidly than if the information had to be retrieved from, for example, the main memory.

The closer a cache is to the CPU, the shorter the latency between the cache and the CPU. The cache closest to the CPU is usually referred to as the level one (L1) cache, the next cache is usually referred to as the level two (L2) cache, and so on. Information most likely to be needed by the CPU, or information more recently accessed by the CPU, is stored in the L1 cache, the next tier of information is stored in the L2 cache, and so on.

Latency can be further reduced by prefetching information into the caches. Prefetching involves, in essence, making a prediction of the information that may be needed by an application, and then prefetching that information from, for example, the main memory into a cache, or from one cache into a cache that is closer to the CPU (e.g., from the L2 cache to the L1 cache).

Hardware-initiated prefetching is typically based on a pattern-matching mechanism. The traffic stream (e.g., the stream of access requests for instructions or data) is monitored to try to find a pattern to the requests. If a pattern can be found, then that pattern can be used to anticipate subsequent requests for information, so that information can be prefetched. For example, if the prefetcher determines that data has been requested from addresses 2, 4, and 6 in the L2 cache because of cache misses in the L1 cache (e.g., a pattern of every other address, corresponding to every other cache line), then the prefetcher can anticipate that the cache line at address 8 might also be needed and can prefetch that cache line.

There is a basic tradeoff in prefetching. As noted above, prefetching can improve performance by reducing latency. On the other hand, if too much information (e.g., too many cache lines) is prefetched, then the efficiency of the prefetcher may be reduced. Furthermore, if a cache is full, then prefetching a new cache line into that cache will result in eviction from the cache of another cache line. Thus, a line in the cache that was there because it was needed might be evicted by a line that only might be needed.

The benefits and risks of prefetching both can increase as the prefetch distance is increased. The prefetch distance is a measure of how far to prefetch based on an observed pattern. If, for instance, data is fetched from addresses 2, 4, and 6 (a pattern of every other address), then data can be prefetched from address 8 if the prefetch distance is one, from addresses 8 and 10 if the prefetch distance is two, and so on. In general, the prefetch distance specifies the number of accesses projected along a pattern starting from a starting point in the pattern (usually, from the last demand access that is a part of the pattern).

The prefetch distance can be managed using a confidence value associated with the pattern. The confidence value, in effect, is a measure of how often the pattern is observed or, equivalently, the number of elements that make up the pattern. The confidence value, and hence the prefetch distance, may initially be zero; that is, prefetching might not begin as soon as an apparent pattern is detected. Instead, prefetching might begin only if the pattern is observed repeatedly; each time the pattern is observed, the confidence value can be incremented, and the prefetch distance can be increased when the confidence value reaches a threshold. In the example above, if the pattern indeed continues as expected and ends up including addresses 8 and 10 in addition to addresses 2, 4, and 6, then the confidence value might be incremented and prefetching can begin. If the pattern continues beyond address 10, then the confidence value and consequently the prefetch distance can again be increased. In other words, if the actual pattern continues to match the predicted pattern, then the confidence value can be increased and, in turn, the prefetch distance can be increased.

SUMMARY

As used herein, an access request refers to a request for information (data and/or instructions) from a memory element. An access request may be a demand request issued by a processing unit, or it may be a request issued by a computer system's operating system or memory management system. In response to an access request, information may be fetched from a memory element to a processing unit, or it may be fetched from one memory element to another memory element (e.g., from main memory to a cache, or from one cache to another).

A stream of access requests may contain multiple, unrelated access requests. In other words, the access requests associated with one application, for example, may be interleaved with access requests associated with one or more other applications. To address this, the various access requests can be filtered so that related requests can be identified and separated from unrelated accesses. The related requests can then be examined to find a pattern to the requests, if there is one.

One method of filtering the access requests is based on a comparison of the memory addresses included in the requests. Many patterns are local and, if there is a pattern, then it usually exists within a relatively small region of memory (e.g., within a memory page). Thus, in one embodiment, a group of requests that address the same physical memory page are identified, and the physical addresses associated with those requests are examined to see if there is a pattern to them.

However, applications generally utilize virtual addresses instead of physical addresses. The virtual addresses are mapped to physical addresses, which can then be used to identify a pattern. The size of a contemporary physical memory page is four (4) kilobytes (KB), which corresponds to 64 cache lines. In such an implementation, the virtual-to-physical mapping changes every 4 KB of physical address space. Thus, one virtual address in the access request stream may map to a first physical memory page, and the next virtual address in the stream may map to a second physical memory page. However, the identity of the second physical memory page is indeterminate until the second virtual address is translated into a physical address.

Embodiments according to the present invention permit prefetching to cross from one physical memory page to another in this situation. That is, if a stream of access requests contains virtual addresses that map to more than one physical memory page then, in embodiments according to the present invention, prefetching can continue from a first physical memory page to a second physical memory page. Importantly, the prefetching advantageously continues based on the confidence level and prefetch distance established while the first physical memory page was the target of the access requests. In other words, the confidence level and prefetch distance that were built up based on access requests that address the first physical memory page can be carried over to the second physical memory page, instead of having to build up these values all over again for the second physical memory page, starting from reduced values (e.g., their initial values). Two of the approaches that can be used to implement this type of prefetching are summarized below.

In one embodiment, prefetching continues until the end of a first physical memory page and then is temporarily suspended until an access request addressing a second physical memory page is made. The access request addressing the second physical memory page serves to confirm the identity of the second physical memory page. Once the confirming access is observed, the confidence value and the prefetch distance based on accesses to the first physical memory page are inherited for prefetches from the second physical memory page. Consequently, prefetches from the second physical memory page can continue with a relatively high confidence value and prefetch distance.

In another embodiment, the prefetcher predicts the next virtual page number/virtual page address and requests the translated physical address from the translation lookaside buffer. In this manner, the identity of the second physical memory page is determined without waiting for a confirming access request and hence without the temporary suspension mentioned above. As in the other embodiment, the confidence level and prefetch distance are inherited so that prefetching can continue with a relatively high confidence level and prefetch distance.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Figure 1:
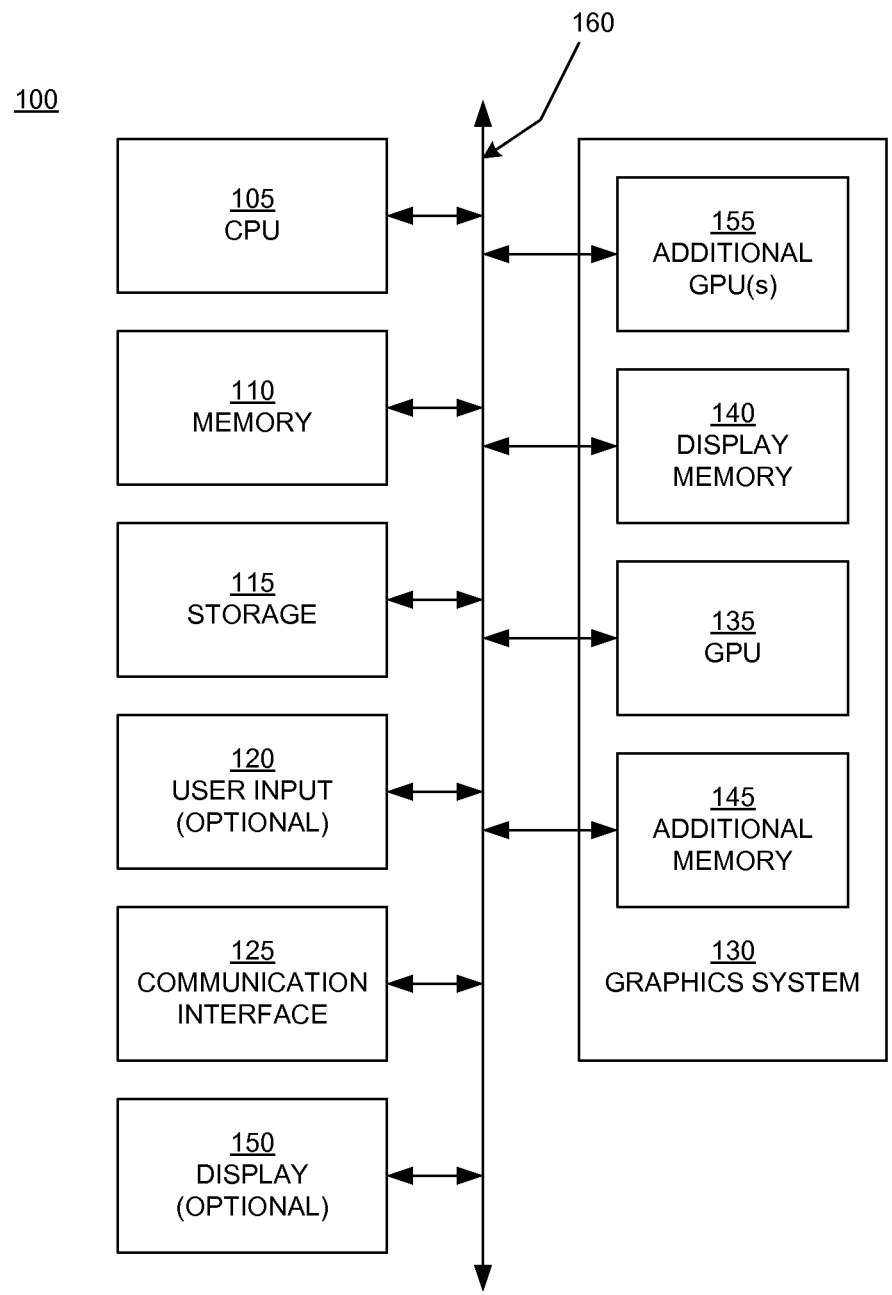
FIG. 1 is a block diagram of an example of a computer system capable of implementing embodiments according to the present invention.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "fetching," "prefetching," "selecting," "establishing," "observing," "translating," "accessing," "storing," "determining," "increasing," "incrementing," "detecting," "suspending," or the like, refer to actions and processes (e.g., flowcharts 500 and 700 of FIGS. 5 and 7, respectively) of a computer system or similar electronic computing device or processor (e.g., system 100 of FIG. 1). The computer system or similar electronic computing device manipulates and transforms data represented as physical (electronic)

quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Non-transitory computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

FIG. 1 is a block diagram of an example of a computer system 100 capable of implementing embodiments according to the present invention. In the example of FIG. 1, the computer system 100 includes a central processing unit (CPU) 105 for running software applications and optionally an operating system. The memory 110 stores applications and data for use by the CPU 105. Storage 115 provides non-volatile storage for applications and data and may include fixed disk drives, removable disk drives, flash memory devices, and CD-ROM, DVD-ROM or other optical storage devices. The optional user input 120 includes devices that communicate user inputs from one or more users to the computer system 100 and may include keyboards, mice, joysticks, touch screens, and/or microphones. The communication or network interface 125 allows the computer system 100 to communicate with other computer systems via an electronic communications network, including wired and/or wireless communication and including the Internet. The optional display device 150 is any device capable of displaying visual information in response to a signal from the computer system 100. The components of the computer system 100, including the CPU 105, memory 110, data storage 115, user input devices 120, communication interface 125, and the display device 150, are connected via one or more data buses 160.

In the FIG. 1 embodiment, a graphics system 130 is connected with the data bus 160 and the components of the computer system 100. The graphics system 130 may include a physical graphics processing unit (GPU) 135 and graphics memory. The GPU 135 generates pixel data for output images from rendering commands.

Graphics memory may include a display memory 140 (e.g., a framebuffer) used for storing pixel data for each pixel of an output image. In another embodiment, the display memory 140 and/or additional memory 145 are part of the memory 110 and are shared with the CPU 105. Alternatively, the display memory 140 and/or additional memory 145 can be one or more separate memories provided for the exclusive use of the graphics system 130.

In another embodiment, graphics processing system 130 includes one or more additional physical GPUs 155, similar to the GPU 135. Each additional GPU 155 is adapted to operate in parallel with the GPU 135. Each additional GPU 155 generates pixel data for output images from rendering commands. Each additional physical GPU 155 can be configured as multiple virtual GPUs that are used in parallel (concurrently) by a number of applications executing in parallel. Each additional GPU 155 can operate in conjunction with the GPU 135 to simultaneously generate pixel data for different portions of an output image, or to simultaneously generate pixel data for different output images.

Each additional GPU 155 can be located on the same circuit board as the GPU 135, sharing a connection with the GPU 135 to the data bus 160, or each additional GPU 155 can be located on another circuit board separately connected with the data bus 160. Each additional GPU 155 can also be integrated into the same module or chip package as the GPU 135. Each additional GPU 155 can have additional memory, similar to the display memory 140 and additional memory 145, or can share the memories 140 and 145 with the GPU 135.

Figure 2A:
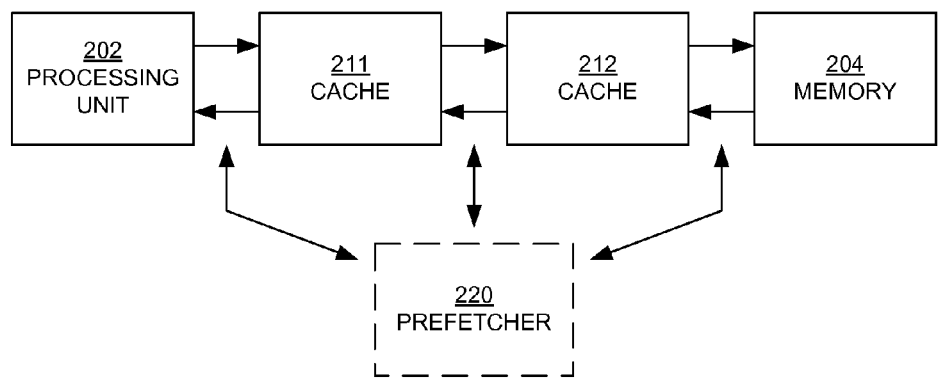
FIG. 2A is a block diagram of a computer system that includes a prefetcher in an embodiment according to the present invention.

FIG. 2A is a block diagram of a computer system 100 that includes a prefetcher 200 in an embodiment according to the present invention. In the example of FIG. 2A, a hierarchy of caches is located between the processing unit 202 and the memory 204. With reference to FIG. 1, the processing unit 202 may be, for example, the CPU 105 or the GPU 135, and the memory 204 may be, for example, the memory 110 or the storage 115, or the display memory 140 or the additional memory 145.

In the example of FIG. 2A, the caches include a first cache 211 and a second cache 212. Although only two caches are shown, embodiments according to the invention are not so limited. The first cache 211 is situated closer to the processing unit 202 than the second cache 212, and may be referred to as a level one (L1) cache. The second cache 212 is situated further away from the processing unit 202 relative to the first cache 211, and may be referred to as a level two (L2) cache. Generally speaking, the latency associated with the first cache 211 is less than the latency associated with the second cache 212.

The processing unit 202 can load or store information (data and/or instructions) into the first cache 211. The processing unit 202 can also request a line of information from the first cache 211; this type of request may be referred to as a demand request. If that information is in the first cache 211, it is referred to as a cache hit. If that line of information is not in the first cache 211 (referred to as a cache miss), then an attempt is made to access that line from the second cache 212. If that line is also not in the second cache 212, then an attempt is made to access that information from the memory 204 (or from another cache if the hierarchy of caches includes more than two caches). The operations just described can be performed under control of the computer system's operating system or memory management system, for example.

A prefetcher 220 is coupled to and can monitor the access requests between the various memory elements. Although the prefetcher 220 is illustrated as a separate element in FIG. 2A, it can be implemented in software as a component of the computer system's operating system or memory management system, for example.

Figure 2B:
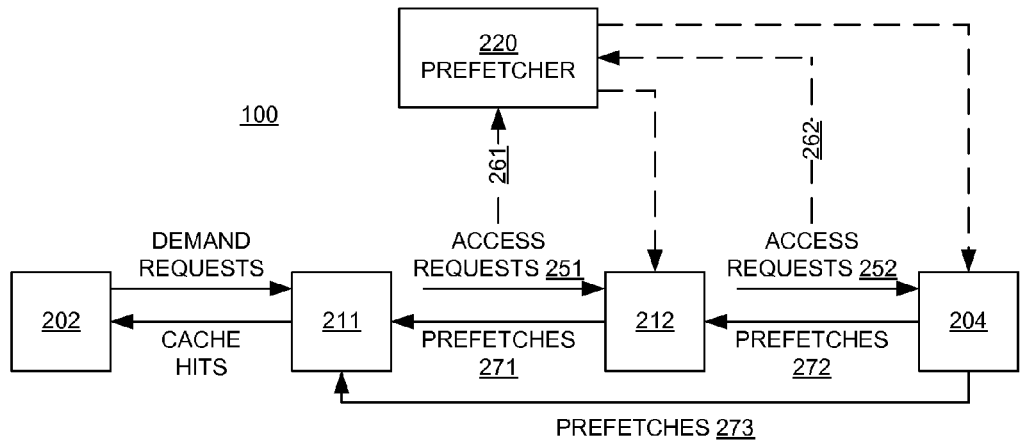
FIG. 2B is a block diagram illustrating the flow of information between elements including a prefetcher in an embodiment according to the present invention.

In particular, with reference to FIG. 2B, the prefetcher 220 can monitor and observe the stream 251 of access requests to the second cache 212, and can determine the pattern 261 of those requests. Also, the prefetcher 220 can monitor and observe the stream 252 of access requests to the memory 204, and can determine the pattern 262 of those requests.

The access requests issued to the second cache 212, for example, generally result from cache misses in the first cache 211. The prefetcher 220 can monitor cache misses in the first cache 211 and detect a pattern (the pattern 261) to the misses, if there is a pattern. That is, the prefetcher 220 can monitor the addresses included in demand requests to the first cache 211 and detect a pattern in the requests that result in cache misses in that cache. Alternatively, the prefetcher 220 can monitor the memory addresses included in the access requests to the second cache 212 (in order to fetch information from the second cache 212 to the first cache 211) and detect a pattern in those requests.

In general, a pattern can be detected based on the number of cache lines between two points in the pattern. The difference between two points in the pattern may be referred to as the delta or the stride. For example, if the pattern included access requests for every third cache line, then the delta or stride is three. The delta or stride between two access requests can be determined using the lower order bits of the address included in the access requests. If the delta or stride is constant over some number of access requests, then a pattern is present.

The prefetcher 220 can then make a prediction based on the pattern, and can prefetch lines from the second cache 212 to the first cache 211 based on the prediction. If, for example, the prefetcher 220 detects that the access requests to the second cache 212 are for every other cache line, then the prefetcher can prefetch every other cache line from the second cache 212 into the first cache 211. One or more lines can be prefetched at a time, depending on the prefetch distance and confidence level associated with the pattern, as described below. In the example of FIG. 2B, the prefetch stream 271 includes lines prefetched from the second cache 212 into the first cache 211 based on the pattern 261 that was determined by observing the stream 251 of access requests.

In a similar fashion, the prefetcher 220 can prefetch one or more lines (prefetch stream 272) from the memory 204 into the second cache 212, or one or more lines (prefetch stream 273) from the memory 204 directly into the first cache 211, or one or more lines from the memory 204 directly into both the first cache 211 and the second cache 212. Ideally, the cache lines in the prefetch streams 271, 272, and 273 precede a demand request for those lines.

Figure 3:
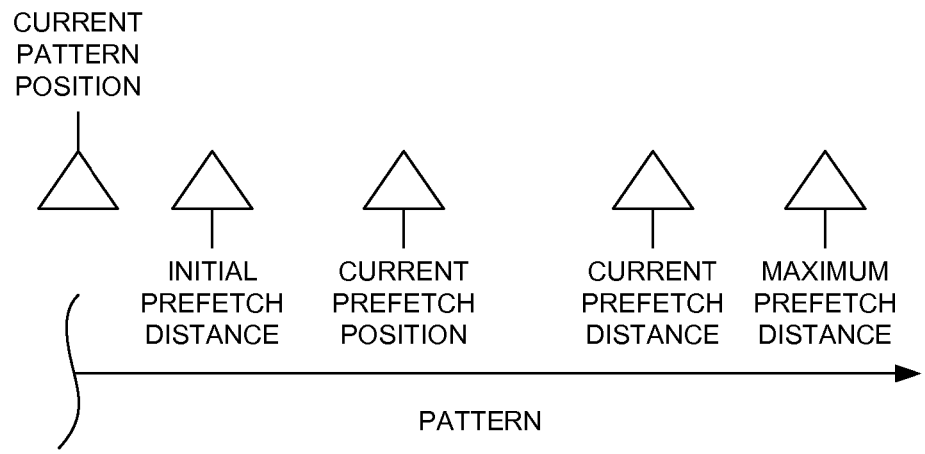
FIG. 3 illustrates prefetch distances in an embodiment according to the present invention.

In FIG. 3, the current pattern position indicates the last point in the pattern known to be correct. Prefetch distances are measured from the current pattern position. The current pattern position can move from left to right in FIG. 3 as points in the pattern are validated as correct. In other words, if a predicted access matches a later, actual access request (e.g., if a prefetched line results in a subsequent cache hit), then the current pattern position is moved accordingly.

The current prefetch position indicates how far prefetching has occurred within the pattern. The current prefetch position is between the current pattern position and the current prefetch distance. The prefetch distance is a measure of how far to prefetch in the pattern. The prefetch distance is determined by taking a starting point in the pattern (the current prefetch position) and projecting a number of accesses further along the pattern. The number of accesses is the prefetch distance. If the prefetch distance is one, then a single line (the next element in the pattern) is prefetched; if the prefetch distance is two, then the next two elements in the pattern are prefetched, and so on.

The initial prefetch distance can be established in advance. The prefetch distance may be initially set to one, for example, indicating that a single line will be prefetched at a time. The prefetch distance can change over time depending on, for example, the confidence level associated with the pattern. The confidence level can be incremented as the pattern increases in length and/or if the prefetched lines result in an increase in the frequency of cache hits.

In the example below (Table 1), the initial prefetch distance and initial confidence level are both zero (0). In the example, based on the addresses in the access requests issued in response to cache misses, a delta or stride of two (2) is observed by the prefetcher 220 (FIG. 2A). At some point, the confidence level is incremented as shown in the example. Once the confidence level reaches a threshold value (e.g., 2), then the prefetch distance can be increased. Generally speaking, the confidence level can be used as a factor in establishing the prefetch distance, but the prefetch distance is not necessarily directly correlated to the value of the confidence level.

TABLE 1

| Address | Delta | Confidence Level | Prefetch Distance |
|---------|-------|------------------|-------------------|
| 2       | —     | 0                | 0                 |
| 4       | 2     | 0                | 0                 |
| 6       | 2     | 1                | 0                 |
| 8       | 2     | 2                | 1                 |
| 10      | 2     | 3                | 2                 |
| etc.    | etc.  | etc.             | etc.              |

Continuing with reference to FIG. 3, the maximum prefetch distance is a defined (e.g., user-specified) limit on the prefetch distance. Thus, even if the confidence level continues to increase, the prefetch distance will not increase if the maximum prefetch distance has been reached.

Figure 4:
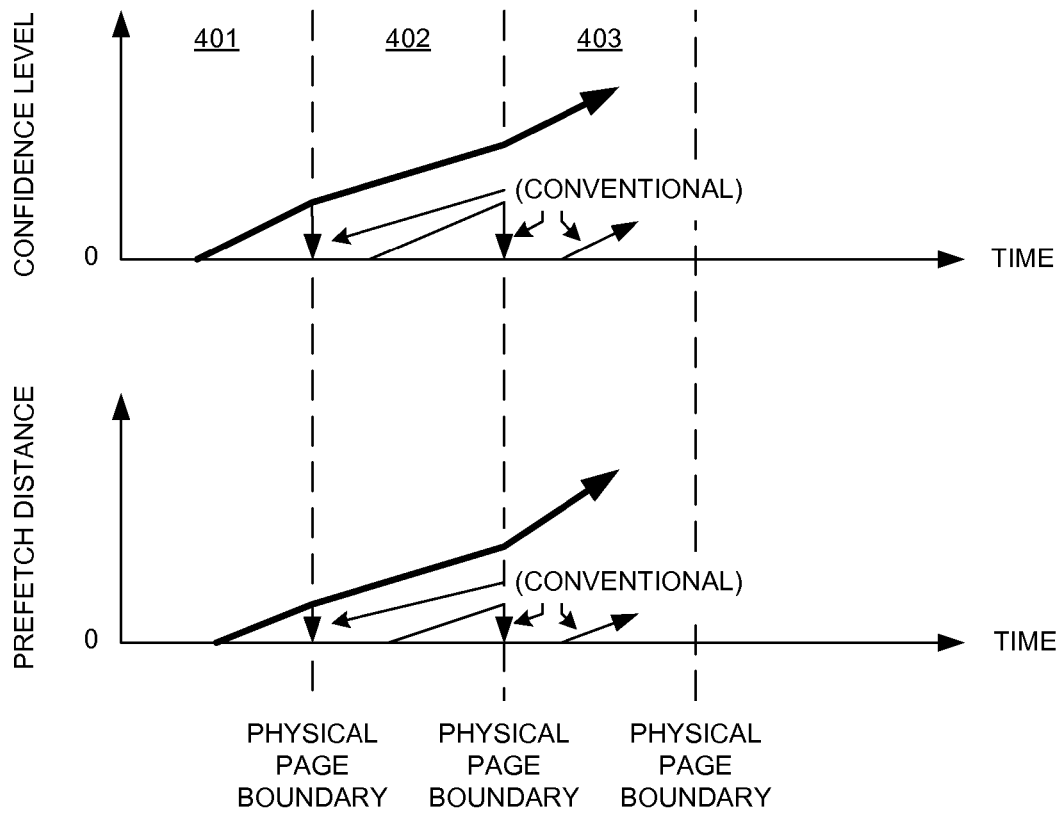
FIG. 4 includes an example showing confidence level as a function of accesses across physical memory pages in an embodiment according to the present invention.

FIG. 4 includes an example showing confidence level as a function of accesses across a first physical memory page 401 and a second physical memory page 402 in an embodiment according to the present invention. In the example of FIG. 4, the first and second physical memory pages are shown as being adjacent to one another; however, the present invention is not so limited. As presented above, the confidence level can increase based on the number of times a pattern of accesses to a physical memory page is repeated and observed. That is, as the number of elements in the pattern increases, the confidence level can be incremented. According to embodiments of the invention, at the boundary of the first physical memory page 401, the confidence level built up during accesses to (prefetches from) the first memory page is inherited for prefetches from the second memory page 402. As shown in FIG. 4, a conventional confidence level is reset to its initial value when the boundary between physical memory pages is reached.

FIG. 4 also includes an example showing prefetch distance as a function of accesses across the first physical memory page 401 and second physical memory page 402 in the present embodiment. As presented above, the prefetch distance can increase based on the value of the confidence level. Thus, in the example of FIG. 4, the prefetch distance tracks the value of the confidence level. According to embodiments of the invention, at the boundary of the first physical memory page 401, the prefetch distance built up during accesses to (prefetches from) the first memory page is inherited for prefetches from the second memory page 402. As shown in FIG. 4, a conventional prefetch distance is reset to its initial value when the boundary between physical memory pages is reached.

The confidence level and prefetch distance can continue to be incremented if the pattern continues for accesses to the second physical memory page 402, and can be inherited for prefetches from a third physical memory page 403, and so on. In practice, a maximum value for the confidence level and/or for the prefetch distance may be specified.

Thus, in embodiments according to the present invention, the confidence level is inherited across physical memory pages, from one physical memory page to the next. As described above, the prefetch distance can be established based on the confidence level. Thus, in embodiments according to the present invention, a relatively high prefetch distance can be carried over from one physical memory page to the next.

Two of the approaches that can be used to implement prefetching according to embodiments of the present invention are presented below.

Figure 5:
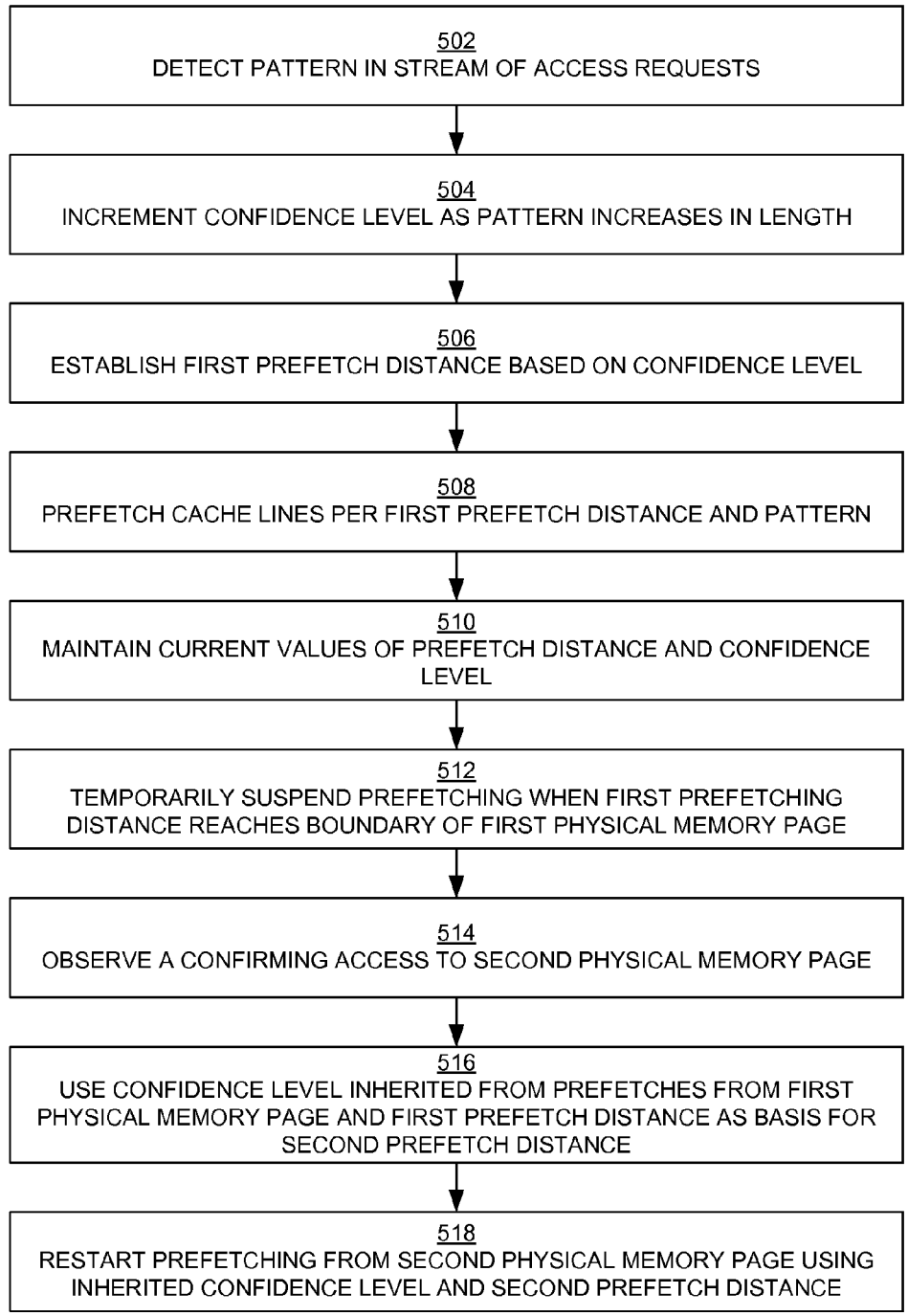
FIG. 5 is a flowchart of an example of a computer-implemented method for prefetching information in an embodiment according to the present invention.

FIG. 5 is a flowchart 500 of an example of a computer-implemented method for prefetching information (e.g., cache lines) in an embodiment according to the present invention. The flowchart 500 can be implemented as computer-executable instructions residing on some form of computer-readable storage medium (e.g., using computer system 100 of FIGS. 1 and 2).

In block 502 of FIG. 5, with reference also to FIGS. 2A, 2B, and 4, a pattern (e.g., the pattern 261) in a stream of access requests (e.g., the stream 251) is detected as previously discussed herein. The access requests address the first physical memory page 401. In one embodiment, the access requests include virtual addresses that are translated into physical addresses for the first physical memory page 401, and the physical addresses are used to detect the pattern. In this embodiment, the virtual addresses are translated by a memory controller or memory management unit (not shown in the figures).

A confidence level is associated with the pattern as previously discussed herein. In block 504 of FIG. 5, the confidence level is incremented as the pattern increases in length.

In block 506, a first prefetch distance can be established based on the confidence level.

In block 508, with reference also to FIGS. 2A and 4, cache lines are prefetched from the first physical memory page 401 into one of the caches 211 or 212 based on the first prefetch distance and the detected pattern as previously discussed herein. The cache lines can be prefetched from the second cache 212 into the first cache 211, from the memory 204 into the second cache 212, or from the memory 204 directly into the first cache 211. The number of cache lines that are prefetched is selected using the first prefetch distance as previously discussed herein.

The first prefetch distance and the confidence level can change as previously described herein. In block 510 of FIG. 5, the current (most recent) values of the first prefetch distance and the confidence level are maintained (e.g., stored) in memory.

In block 512 of FIG. 5, when the current value for the first prefetch distance reaches or extends beyond the end of the first physical memory page 401 (FIG. 4), then prefetching is suspended temporarily. In other words, if the prefetch distance is large enough so that no more cache lines are available for prefetching from the first physical memory page 401, then prefetching is temporarily suspended. With reference to FIG. 2B, for example, the prefetch stream 271 is halted although the stream 251 of access requests continues to flow. As will be seen, prefetching can be reinstated subject to the condition of block 514.

For example, consider a situation in which the cache contains 64 cache lines, the last cache line that was prefetched was at address 58, every other cache line is being prefetched, and the prefetch distance is five (5). In this situation, the cache lines at addresses 60, 62, and 64 can be prefetched, but then prefetching is temporarily suspended.

In block 514 of FIG. 5, with reference also to FIGS. 2A, 2B, and 4, a demand request from the processing unit 202 is observed by the prefetcher 220. The demand request includes a virtual address that is translated, in this embodiment, by the memory controller or memory management unit into a physical address for the second physical memory page 402, for example. This access request serves to confirm that the second physical memory page 402 is the target of any future access requests resulting from cache misses.

In block 516 of FIG. 5, upon confirming that the second physical memory page 402 (FIG. 4) is the target of the access request, the current values for the confidence level and the first prefetch distance can be utilized for access requests that target the second physical memory page. More specifically, the confidence level and the first prefetch distance can be used as the basis for a second prefetch distance that is used to select and prefetch cache lines in the second physical memory page 402. For example, the second prefetch distance may be greater than the first prefetch distance, less than the first prefetch distance (but greater than its initial value), or the same as the first prefetch distance, depending on the confidence level and also depending on how prefetching is being implemented. The second prefetch distance and the confidence level can continue to change (e.g., increase) if the pattern of access requests continues across the second physical memory page 402. If the access requests continue until the prefetch distance again extends to or beyond the boundary of the second physical memory page 402, then the process described by the flowchart 500 can be repeated for a third physical memory page, and so on.

In block 518 of FIG. 5, prefetching is restarted using the confidence level inherited from prefetches to the first physical memory page and using the second prefetch distance.

Thus, in embodiments according to the present invention, the confidence level and prefetch distance utilized for accesses to the first physical memory page 401 can be inherited and utilized for accesses to the second physical memory page 402, and so on. Consequently, prefetches from the second physical memory page 402 and subsequent physical memory pages can continue with a relatively high confidence value and prefetch distance, for as long as the pattern of accesses is repeated. However, in actual practice, a maximum value for the confidence level and/or for the prefetch distance may be applied.

Figure 6:
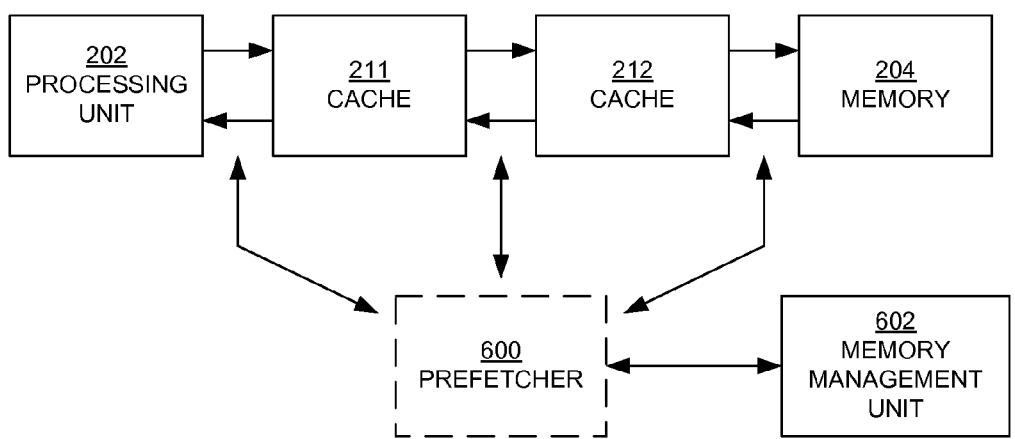
FIG. 6 is a block diagram of a computer system that includes a prefetcher in an embodiment according to the present invention.

FIG. 6 is a block diagram of a computer system 100 that includes a prefetcher 600 in another embodiment according to the present invention. In the example of FIG. 6, as in the example of FIG. 2A, a hierarchy of caches is located between the processing unit 202 and the memory 204. With reference to FIG. 1, the processing unit 202 may be, for example, the CPU 105 or the GPU 135, and the memory 204 may be, for example, the memory 110 or the storage 115, or the display memory 140 or the additional memory 145.

The embodiment of FIG. 6 differs from that of FIG. 2A in that the prefetcher 600 includes logic that allows it to predict the next virtual page number, or virtual page address, and then request the translated physical address via a translation lookaside buffer (TLB) plus a port to the page table walker in the memory controller or memory management unit 602.

In this manner, the identity of the second physical memory page is determined without waiting for a confirming access request and hence without the temporary suspension mentioned in the discussion of FIG. 5. As in the embodiment of FIG. 2A, the confidence level and prefetch distance are inherited so that prefetching can continue with a relatively high confidence level and prefetch distance.

Figure 7:
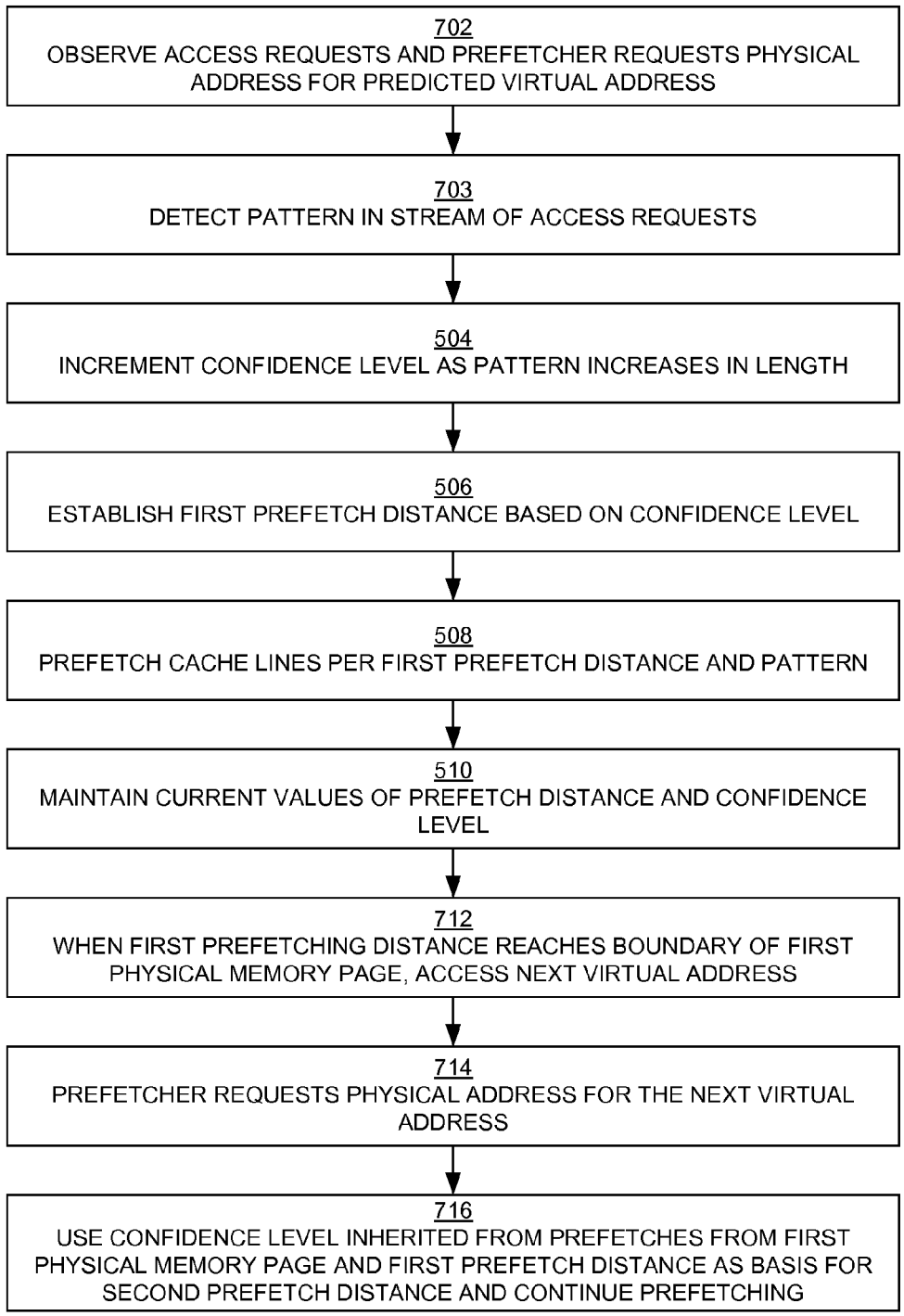
FIG. 7 is a flowchart of an example of a computer-implemented method for prefetching information in an embodiment according to the present invention.

FIG. 7 is a flowchart 700 of an example of a computer-implemented method for prefetching information (e.g., cache lines) in an embodiment according to the present invention. The flowchart 700 can be implemented as computer-executable instructions residing on some form of computer-readable storage medium (e.g., using computer system 100 of FIGS. 1 and 6). Some of the blocks in FIG. 7 are the same as those in FIG. 5 and so are not discussed in detail.

In block 702 of FIG. 7, the prefetcher 600 (FIG. 6) observes a stream of access requests (e.g., the stream 251 of FIG. 2B) and predicts the next virtual page number/virtual page address.

In block 703 of FIG. 7, with reference also to FIG. 6, the prefetcher 600 requests the translated physical address via a TLB plus a port to the page table walker in the memory controller or memory management unit 602. A pattern of access requests (e.g., the pattern 261 of FIG. 2B) is detected as previously discussed herein.

In block 504 of FIG. 7, a confidence level associated with the pattern is incremented as the pattern increases in length.

In block 506 of FIG. 7, a first prefetch distance can be established based on the confidence level.

In block 508 of FIG. 7, with reference also to FIGS. 2A and 4, cache lines are prefetched from the first physical memory page 401 into one of the caches 211 or 212 based on the first prefetch distance and the detected pattern as previously discussed herein.

In block 510 of FIG. 7, the current (most recent) values of the first prefetch distance and the confidence level are maintained (e.g., stored) in memory.

In block 712 of FIG. 7, in response to the current value for the first prefetch distance reaching (including extending beyond) the end of the first physical memory page 401 (FIG. 4), the prefetcher 600 (FIG. 6) accesses the next virtual address in the stream of demand requests from the processing unit 202 (FIG. 2).

In block 714 of FIG. 7, with reference also to FIGS. 4 and 6, the prefetcher 600 requests the translated physical address for the virtual address of block 712 via the TLB as mentioned above. For the purposes of this example, the virtual address corresponds to a physical address for a physical memory page other than the first physical memory page 401 (e.g., it is for the second physical memory page 402).

In block 716, prefetching continues using the confidence level inherited from accesses to the first physical page 401 and using a second prefetch distance that is based on the first prefetch distance. That is, the current values for the confidence level and the first prefetch distance can be utilized for access requests that target the second physical memory page 402. More specifically, the confidence level and the first prefetch distance can be used as the basis for a second prefetch distance that is used to select and prefetch cache lines in the second physical memory page 402. For example, the second prefetch distance may be greater than the first prefetch distance, less than the first prefetch distance (but greater than its initial value), or the same as the first prefetch distance, depending on the confidence level and also depending on how prefetching is being implemented. The second prefetch distance and the confidence level can continue to change (e.g., increase) if the pattern of access requests continues across the second physical memory page 402. If the access requests continue until the prefetch distance again extends to or beyond the boundary of the second physical memory page 402, then the process just described can be repeated for a third physical memory page, and so on.

Accordingly, the prefetch distance and confidence level utilized for accesses to the first physical memory page 401 can be inherited and utilized for accesses to the second physical memory page 402, and so on. Consequently, prefetches from the second physical memory page 402 and subsequent physical memory pages can continue with a relatively high confidence value and prefetch distance, for as long as the pattern of accesses is repeated. Furthermore, prefetching is not stalled (even temporarily) when the boundary of a physical memory page is reached, and therefore prefetching proceeds aggressively across physical memory pages.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of a fully functional computing system, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Various functions described herein may be provided through a remote desktop environment or any other cloud-based computing environment.

Embodiments according to the invention are thus described. While the present disclosure has been described in particular embodiments, it should be appreciated that the invention should not be construed as limited by such embodiments, but rather construed according to the below claims.

What is claimed is:

1. A system comprising:
a plurality of caches; and
a prefetcher configured to prefetch cache lines from a first physical memory page into a cache of the plurality of caches, wherein the cache lines prefetched into the cache are selected using a prediction determined from a pattern of accesses across the first physical memory page associated with the cache and also using a first prefetch distance that is determined based on the pattern of the accesses, wherein a value for the first prefetch distance corresponds to a value for a first confidence level that is also determined based on the pattern of the accesses, wherein cache lines in a second physical memory page are selected for prefetching using the pattern and a value for a second prefetch distance that is based on the value of the first prefetch distance and that corresponds to a value for a second confidence level that is based on the value of the first confidence level.

2. The system of claim 1 wherein the value of the first confidence level increases as the pattern of the accesses across the first physical memory page increases in length.

3. The system of claim 1 wherein the prefetcher is further configured to observe the operations and detect the pattern.

4. The system of claim 1 wherein prefetching from the second physical memory page is suspended when the first prefetch distance reaches the end of the first physical memory page until a confirming access request to the second physical memory page is made.

5. The system of claim 1 wherein the prefetcher is further configured to predict a virtual memory page number and request a physical memory page number via a translation lookaside buffer and a port to a memory management unit.

6. The system of claim 1 wherein a virtual address for the second physical memory page is translated to a physical address for the second physical memory page in response to the first prefetch distance reaching a boundary between the first and second physical memory pages.

7. A computer system comprising:
a processing unit; and
memory coupled to the processing unit and having stored therein instructions that, if executed by the computer system, cause the computer system to execute a prefetcher that performs operations comprising:
prefetching cache lines from a first physical memory page into a cache selected from a plurality of caches, wherein the cache lines are selected for prefetching using a prediction determined from a pattern of cache misses, the cache lines also selected using a value for a first prefetch distance, wherein the value of the first prefetch distance corresponds to a value for a first confidence level associated with the pattern, wherein the value of the first confidence level increases as the pattern increases in length;
storing the value of the first prefetch distance and the value of the first confidence level; and
selecting cache lines in a second physical memory page for prefetching using the pattern, also using a value for a second prefetch distance that is based on the value of the first prefetch distance, and also using a value for a second confidence level that is based on the value of the first confidence level.

8. The computer system of claim 7 wherein the operations performed by the prefetcher further comprise observing the cache line misses and detecting the pattern.

9. The computer system of claim 7 wherein prefetching from the second physical memory page is suspended when the first prefetch distance reaches the end of the first physical memory page until a confirming access request to the second physical memory page is made.

10. The computer system of claim 7 wherein the operations performed by the prefetcher further comprise predicting a virtual memory page number and requesting a physical memory page number via a translation lookaside buffer and a port to a memory management unit.

11. The computer system of claim 7 wherein the operations performed by the prefetcher further comprise translating a virtual address for the second physical memory page to a physical address for the second physical memory page in response to the first prefetch distance reaching a boundary between the first and second physical memory pages.

12. A method implemented by a computer system comprising a processor, a memory, and a plurality of caches coupled to the processor and the memory, the method comprising:
identifying a pattern of access requests;
increasing a value of a first confidence level associated with the pattern as the pattern increases in length;
determining a value for a first prefetch distance using the value of the first confidence level;
prefetching cache lines from a first physical memory page into a cache selected from the plurality of caches, wherein the cache lines are selected for prefetching using a prediction determined from the pattern of access requests and also using the value of the first prefetch distance; and
selecting cache lines in a second physical memory page for prefetching using the pattern and also using a value for a second prefetch distance that is based on the value of the first prefetch distance and a value for a second confidence level that is based on the value of the first confidence level.

13. The method of claim 12 further comprising observing the access requests and detecting the pattern.

14. The method of claim 12 further comprising suspending prefetching from the second physical memory page when the first prefetch distance reaches the end of the first physical memory page until a confirming access request to the second physical memory page is made.

15. The method of claim 12 further comprising predicting a virtual memory page number, which is translated to a physical address via a translation lookaside buffer ported to a table walker in a memory management unit.

16. The method of claim 12 further comprising translating a virtual address for the second physical memory page to a physical address for the second physical memory page in response to the first prefetch distance reaching a boundary between the first and second physical memory pages.

* * * * *